United States Patent
Schueler

(10) Patent No.: US 6,391,194 B2
(45) Date of Patent: May 21, 2002

(54) FILTER DEVICE FOR A FUEL SUPPLY SYSTEM OF AN INTERNAL COMBUSTION ENGINE OF A MOTOR VEHICLE

(75) Inventor: Peter Schueler, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/748,406

(22) Filed: Dec. 26, 2000

(30) Foreign Application Priority Data

Dec. 28, 1999 (DE) .......................... 199 63 388

(51) Int. Cl.⁷ .................. B01D 35/147; B01D 35/18
(52) U.S. Cl. .................. 210/130; 210/184; 210/429; 210/433.1; 210/450
(58) Field of Search .................. 210/99, 130, 133, 210/184, 429, 430, 433.1, 450, 453; 123/514

(56) References Cited

U.S. PATENT DOCUMENTS 1,368,475 A * 2/1921 Blakely ................... 123/514
2,423,329 A * 7/1947 Le Clair ................... 210/133
5,078,167 A   1/1992 Brandt et al.
6,269,835 B1 * 8/2001 Kochsmeier .............. 137/549

FOREIGN PATENT DOCUMENTS

DE       19736846 A1 *  3/1999   .......... F04B/53/20

* cited by examiner

*Primary Examiner*—Matthew O. Savage
(74) *Attorney, Agent, or Firm*—Michael J. Striker

(57) ABSTRACT

A filter device for fuel supply system of an internal combustion engine of a vehicle has a housing, a filter insert arranged in the housing, at a dirt side a supply from a fuel container, at a clean side an outlet to an internal combustion engine, a return to the fuel supply container from the dirt side, a valve controlling the return, the valve having a movable wall which is loaded with a fuel pressure at the clean side and holding the return closed until a fuel pressure at the clean side exceeds a predetermined value, and thereafter is released by the valve, the valve having a rod which is displaceable by the movable wall and extends through the filter insert from the clean side to the dirt side, the movable rod having an end region which is arranged at the dirt side and controlling the return.

8 Claims, 2 Drawing Sheets

FILTER DEVICE FOR A FUEL SUPPLY SYSTEM OF AN INTERNAL COMBUSTION ENGINE OF A MOTOR VEHICLE

BACKGROUND OF THE INVENTION

The present invention relates to a fuel device for a fuel supply system of an internal combustion engine of a motor vehicle.

Such a filter device is disclosed for example in U.S. Pat. No. 5,078,167. This filter device has a housing, in which a filter insert is arranged. The filter device has a dirt-side supply from a fuel supply container of the motor vehicle and a clean-side outlet to the internal combustion engine. Moreover the filter device has a return leading from the dirt side to the fuel supply container, which is controlled by a valve device. The valve device has a movable wall which is loaded with the fuel pressure at the clean side of the filter device and formed as a diaphragm. The valve device holds the return closed until the fuel pressure at the clean side exceeds a predetermined value, and thereby the diaphragm is deformed and the return is released.

The valve device has an expensive construction with a valve seat movable by the diaphragm. Moreover, the valve device is flanged transversely to the housing of the filter device and requires a great mounting space. The construction and the mounting space of the filter device is negatively influenced by the valve device.

SUMMARY OF THE INVENTION

Accordingly, it is an object of present invention to provide a filter device of the above mentioned general type, which avoids the disadvantages of the prior art.

In keeping with these objects and with others which will become apparent hereinafter, one feature of present invention resides, briefly stated, in a filter device for a fuel supply system of an internal combustion engine of a motor vehicle, in which the valve device has a rod which is displaceable by the movable wall and extends through the filter insert from the clear side to the dirt side and controls with its end region the return at the dirt side.

When the filter device is designed in accordance with the present invention, the construction of the valve device is simplified and moreover the mounting space is reduced, so that the filter device can be produced correspondingly simpler and with less space.

In accordance with another feature of the present invention the end region of the rod is formed as a sealing surface and cooperates with a valve seat which surrounds an opening of the return. It involves an especially simple construction of the valve device for the small separate valve member.

In accordance with another feature of the present invention, the filter device has a heating device arranged at the dirt side. This prevents loading of the filter insert at low temperatures. Thereby the heating device has to be designed only for the actual fuel quantity passing through the filter insert.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
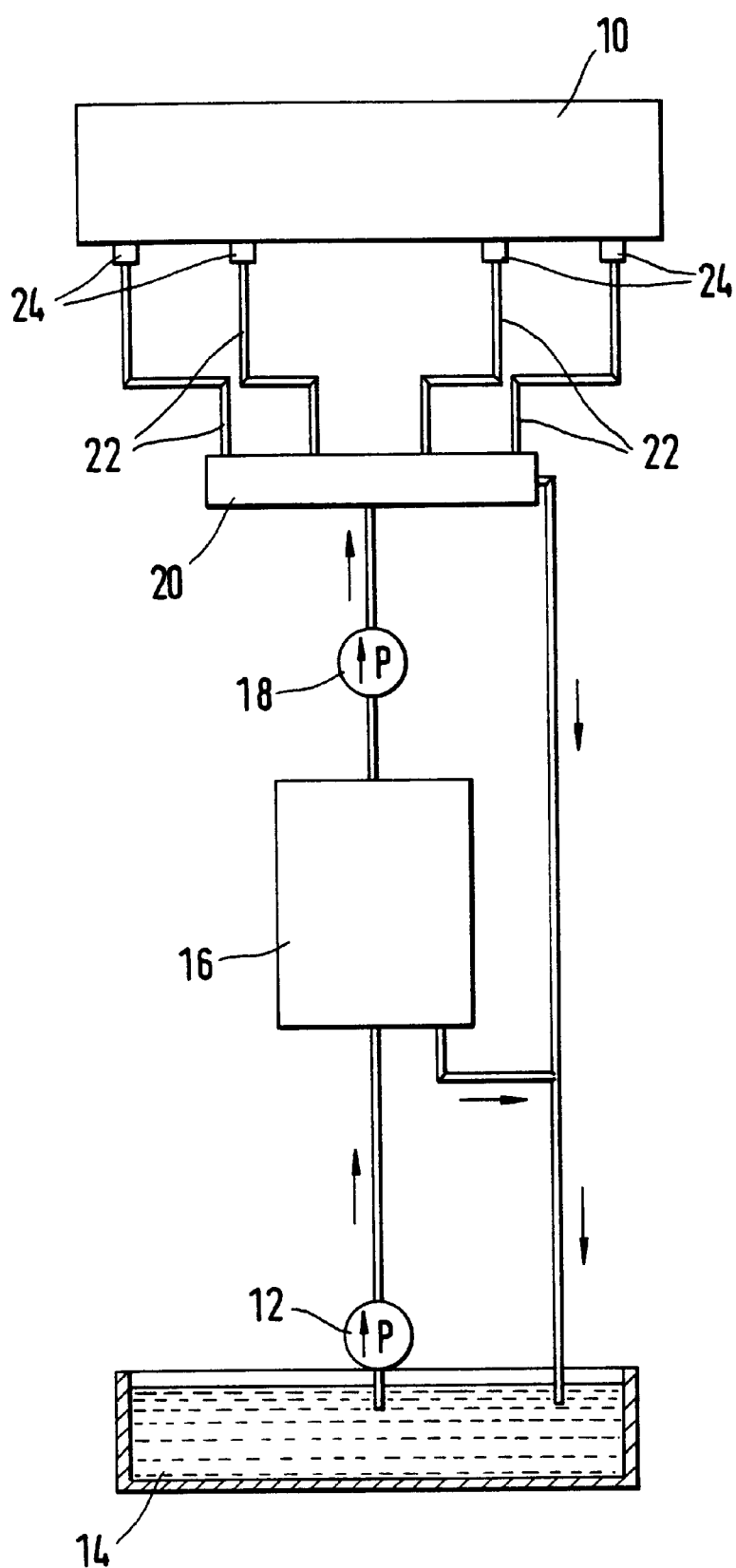
FIG. 1 is a simplified, schematic view of a fuel supply system of an internal combustion engine of a motor vehicle, with a filter device in accordance with the present invention.

FIG. 1 shows a fuel supply system of an internal combustion engine of a motor vehicle. The internal combustion engine 10 is for example a self-igniting internal combustion engine, a diesel motor. The fuel supply system has a feeding aggregate 12, which feeds the fuel from a fuel supply container 14. The fuel fed by the feeding aggregate 12 passes through a filter device 16 which will be explained later on. The fuel is supplied after passing the filter device 16, to a high pressure pump 18. The high pressure side of the high pressure pump 18 is connected with a high pressure storage 20 in form of a rail. From it, a conduit 22 extends through each cylinder of the internal combustion engine, to an injector 24.

Figure 2:
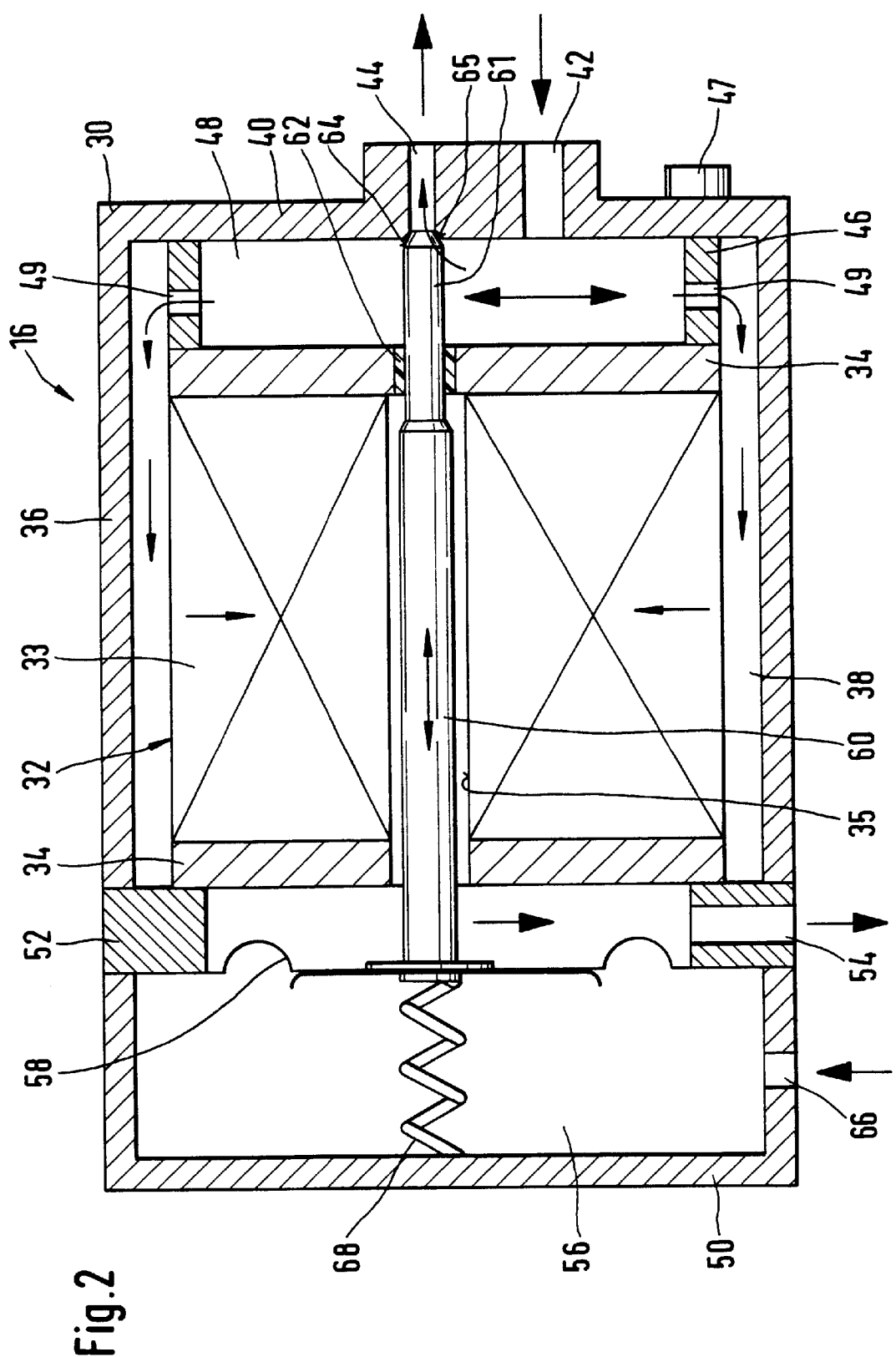
FIG. 2 is a view showing the inventive filtering device on an enlarged scale and in a longitudinal section.

FIG. 2 illustrates the construction of the filter device 16. The filter device 16 has a housing 30 which is, for example, substantially cup-shaped. A filter insert 32 is arranged in the housing 30 and formed at least approximately hollow-cylindrical in form of a filter cartridge. The filter insert 32 has a filter fabric 33 which is provided at both axially facing ends with a ring-shaped cover 34. The filter insert 32 has a central throughgoing opening 35, which is substantially coaxially surrounded by the filter fabric 32. A ring chamber 38 is formed between the outer surface of the filter insert 32 and its surrounding wall 36 of the housing 30.

The housing 30 has a bottom 40 which is opposite to the cover 34 of the filter insert 32. An opening 42 is formed in the bottom 40 of the housing 30. It forms a supply for fuel which is fed by the feeding aggregate 12 from the fuel supply container 14. Moreover, a further opening 44 is formed in the bottom 40 of the housing 30. A return from the filter device 16 to the fuel supply container 14 is connected to a further opening 44. The opening 44 is arranged at least approximately coaxially to the throughgoing opening 35 of the filter insert 32.

At least approximately hollow-cylindrical heating device 46 is arranged between the bottom 40 of the housing 30 and the cover 34 of the filter insert 32 which is located opposite to the bottom. The heating device 46 has at least approximately the same outer cross-section as the filter insert 32. The heating device 46 is composed at least partially of an electrically conductive material, in particular metal. The heating device 46 is connected with an electrical connection 47 which is located on the outer side of the housing 30. The heating device 46 therefore is heated during flow of current. The fuel which flows through the opening 42 and the bottom 40 of the housing 30 is fed in the chamber 48 which is limited by the bottom 40, the cover 34 of the filter insert 30 and the heating device 46. The heating device 46 has a plurality of openings 49 which are distributed over its periphery. Through these openings the fuel can be supplied from the chamber 48 into the chamber 38. The filter insert 32 is supported over the the heating device 46 on the bottom 40 of the housing 30.

The open side of the housing 30 is closed by a cover 50. An intermediate plate 52 is arranged between the housing 30 and the cover 50. The intermediate plate 52 has a smaller inner cross-section than the housing 30, so that the intermediate plate 52 engages the step 34 of the filter insert 32 and the filter insert 32 is fixed between the heating device 46 at one side and the intermediate plate 52 on the other side in direction of its longitudinal axis. A seal is provided between the cover 34 of the filter insert 32 and the intermediate plate 52 to prevent penetration of the fuel from the ring chamber 38. An opening 54 is formed in the intermediate disk 52, and an outlet of the high pressure pump 18 is connected to it.

Fuel which flows via the supply through the opening 42 into the chamber 48 reaches through the openings 49 in the heating device 46 the ring chamber 38 and flows radially inwardly through the filter cloth of the filter insert 32 in the throughgoing opening 35, and then flows from there through the intermediate disk 52 through its openings 54 to the high pressure pump 18. The chamber 48 and the annular chamber 38 are arranged at a dirt side of the filter device 16, and the throughgoing opening 35 and the inner chamber of the intermediate plate 52 are arranged at the clean side of the filter device 16. For controlling the return, which is the opening 44 at the dirt side of the filter device 16, a valve device is provided and controls fuel pressure at the suction side of the filter device 16.

The valve device has a movable wall 58 which limits a chamber 56 between the intermediate plate 52 and the cover 50. The movable wall 58 can be formed for example by a diaphragm which is clamped between the intermediate plates 52 and the cover 50. The diaphragm 58 is connected with a further part of the valve device formed as a rod 60. It extends approximately coaxial to the throughgoing openings 35 of the filter insert 32, and through it penetrates into the chamber 38 at the dirt side of the filter device 16. The rod 36 can have a stepped diameter, and before its passage through the cover 34 of the filter insert 32 which limits the chamber 38, merges into a portion 61 having a smaller diameter. A seal is provided between the rod 60 and the throughgoing opening 35 of the cover 34. It is formed as an elastic sealing element 62 which is clamped between the rod and 60 and the throughgoing opening 35. Because of the sealing element 62, the suction side of the filter device 60 is reliably separated from the dirty side.

The end of the rod 60 which extends in the chamber 48 serves as a valve member. It closes the opening 44 in the bottom 40 of the housing 30 and thereby controls the return which leads from the opening 44 to the fuel supply container 14. The rod 30 can be provided at its end with an incline 64 which acts as sealing surface and/or the opening 44 can have at its edge an incline 65 acting as a seat valve. Therefore a reliable sealing of the opening 44 by the end of the rod 60 is provided. A guidance of the rod 60 is obtained by the sealing element 63, so that it is arranged at least approximately coaxially in the throughgoing opening 35 of the filter insert 32 and at least approximately coaxially to the opening 44 in the bottom 40 of the housing 30, and is displaceably guided. With the sealing element 62, moreover a friction force is produced on the rod 60 and dampens the movement of the rod 60. Thereby displacement movements of the rod 60 which are generated by pressure fluctuations are dampened and therefore prevented or at least weakened.

The diaphragm 58 is loaded at its side facing the filter insert 32 by fuel pressure at the clean side of the filter device 16. At its opposite side, the diaphragm 52 is loaded with a reference pressure. The chamber 56 can be connected with an ambiance for example through an opening 66 in the cover 50, so that the reference pressure acting on the diaphragm 58 is the ambient air pressure. Alternatively the chamber 56 can be connected via the opening 66 also with the return to the fuel supply container 14, so that the reference pressure acting on the diaphragm 58 is the fuel pressure in the return. It can be provided that a spring 68 is arranged in the chamber 56, so that the diaphragm 58 is loaded additionally to the reference pressure. The spring 68 is clamped between the cover 50 and the diaphragm 58.

The operation of the filter device 16 will be explained herein below. When the fuel tank at the clean side of the filter device 16 applies a smaller force to the diaphragm 58 that the reference pressure in the chamber 56 as well as the spring 68, the reference pressure and the spring 68 press the rod 60 with its sealing surface 64 in the valve seat 65 at the edge of the opening 44, so that the opening 44 and thereby the return to the fuel supply tank 14 is closed. The total fuel quantity which flows through the opening 42 of the filter device 16 therefore flows through filter insert 32 and through the opening 54 in the intermediate place 52 from the filter device 16 to the high pressure pump 18. The fuel consumption of the high pressure pump 18 is not constant, but instead it depends on different operational parameters of the internal combustion engine. When the fuel consumption of the high pressure pump 18 reduces, the fuel pressure on the clean side of the filter device 16 increases. When the fuel pressure at the clean side of the filter device 16 exceeds a predetermined value, the force applied by it to the diaphragm 58 is greater than the force applied by the reference pressure and the spring 68, so that the diaphragm 58 and together with it the rod 60 is displaced to the cover 50. The rod 60 with its sealing surface 64 lifts from the valve seat 65 so that the opening 44 and the return to the fluid supply container 14 is open. Then only one part of the fuel flowing through the filter device 16 through the opening 42 passes through the filter insert 32, while another part flows directly through the opening 44 and the return into the fuel supply container 14. This is advantageous especially at low temperatures, since then the heating output of the heating device 46 must be used only for the fuel quantity which flows to the high pressure pump 18 and passes through the filter insert 32, and not the total fuel quantity which is supplied to the filter device 16. The heating device 46 can be controlled in dependence on the temperature, so that it is turned on when a predetermined temperature is exceeded, to avoid a thickening of the fuel and a damage to the filter insert 32 which can be caused by it.

In deviations from the above described embodiment it can be provided that the rod 60 does not operate as a valve member for controlling the opening 44, but instead a separate valve member is arranged at the dirt side of the filter device 16 in the chamber 48 and activated by the rod 60.

It will be understood that each of the elements described above, or two or more together, may also find a useful application in other types of constructions differing from the types described above.

While the invention has been illustrated and described as embodied in filter device for a fuel supply system of an internal combustion engine of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A filter device for a fuel supply system of an internal combustion engine of a vehicle, comprising:
   a housing;
   a filter insert arranged in said housing to define a dirt side and a clean side; means forming at the dirt side a supply opening through said housing for connection to a fuel container;

means forming at the clean side an outlet opening through said housing for connection to an internal combustion engine;

means forming a return opening through said housing for connection to the fuel supply container from the dirt side;

valve means for controlling flow through said return opening, said valve means having a movable wall bounding a portion of said clean side and of which is loaded with a fuel pressure at the clean side, said valve means having a rod which is displaceable by said movable wall and extends through said filter insert from the clean side to the dirt side, said movable rod having an end region which is arranged at the dirt side and controls flow through said return opening, said end region closing said return opening until the fuel pressure at the clean side exceeds a predetermined value and moves said movable wall and end region connected thereto away from the return opening to release the fuel pressure at the clean side.

2. A filter device as defined in claim 1, wherein said end region of said rod is formed as a sealing surface and cooperates with a valve seat which surrounds said return opening.

3. A filter device as defined in claim 1, wherein said filter insert is generally cylindrical and has a central through-going opening through which said rod extends.

4. A filter device as defined in claim 1, wherein said movable wall at another end which is opposite to the side loaded with the fuel pressure at the clean side, is enclosed by a cover and defines a chamber therewith, wherein said another side of said movable wall can be loaded with a reference pressure admitted into the chamber via an opening through said cover.

5. A filter device as defined in claim 1, wherein said movable wall at another side which is opposite to a side loaded with the fuel pressure at the clean side, is loaded by a springy element.

6. A filter device as defined in claim 1; and further comprising an elastic sealing element which is clamped between said filter insert and said rod so that said rod is displaceably guided over said sealing element.

7. A filter device as defined in claim 6, wherein said sealing element produces a friction force on said rod, through which a displacement movement of said rod is dampened.

8. A filter device as defined in claim 1; and further comprising a heating device arranged at the dirt side.

* * * * *